United States Patent [19]

Merritt

[11] Patent Number: 5,345,656
[45] Date of Patent: * Sep. 13, 1994

[54] ELASTIC CORD LOCK

[75] Inventor: Richard C. Merritt, Barrie, Canada

[73] Assignee: Polytech Netting Industries, Inc., St. Catharines, Canada

[ * ] Notice: The portion of the term of this patent subsequent to May 11, 2010 has been disclaimed.

[21] Appl. No.: 23,894

[22] Filed: Feb. 26, 1993

Related U.S. Application Data

[63] Continuation of Ser. No. 842,453, Feb. 27, 1992, Pat. No. 5,208,950.

[51] Int. Cl.$^5$ .................................... F16G 11/00
[52] U.S. Cl. ........................... 24/115 H; 24/115 R; 24/132 WL
[58] Field of Search ............... 24/115 H, 712.9, 712.3, 24/715.3, 115 R, 115 A, 115 K, 132 WL, 115 G; 403/310, 209

[56] References Cited

U.S. PATENT DOCUMENTS

| 189,274 | 4/1877 | Smith | 24/115 R |
|---|---|---|---|
| 1,379,093 | 5/1921 | Freeberg | 24/115 H |
| 2,740,654 | 4/1956 | Orschel | 24/115 R |
| 2,877,527 | 3/1959 | Bond | 24/115 H |
| 3,174,747 | 3/1965 | Kolmar | 24/115 R |
| 3,470,570 | 10/1969 | Christiansen | 24/129 D |
| 3,897,161 | 7/1975 | Reinwall, Jr. | 24/115 R |
| 4,049,357 | 9/1977 | Hamisch, Jr. | 24/115 H |
| 4,156,574 | 5/1979 | Boden | 403/211 |
| 4,379,358 | 4/1983 | Wilrow | 24/136 R |
| 4,455,717 | 6/1984 | Gray | 24/115 R |
| 4,493,134 | 1/1985 | Karr | 24/132 WL |
| 4,635,698 | 1/1987 | Anderson | 24/115 R |
| 4,715,094 | 12/1987 | Herdman | 24/712.3 |
| 4,896,403 | 1/1990 | Vouros | 24/115 H |
| 4,999,887 | 3/1991 | Kraus | 24/662 |
| 5,029,371 | 7/1991 | Rosenblood et al. | 24/712.9 |

Primary Examiner—Victor N. Sakran
Attorney, Agent, or Firm—Basile and Hanlon

[57] ABSTRACT

A mechanical cord lock forming a non-slipping loop in an elastic cord such as elastic bungee cord employed in a vehicle restraining net is disclosed. The connector includes two releasably engageable parts one of which has concave sidewalls formed on opposite sides thereof and a central wall formed intermediate the concave sidewalls. The second part has spaced concave sidewalls each with a pair of depending legs formed on opposite end walls which when mated with the first connector part defines two tortuous paths through the connector parts which ensure that the elastic cord lengths that are placed therethrough in a stretched position remain in such position without slippage.

5 Claims, 2 Drawing Sheets

ELASTIC CORD LOCK

This application is a continuation of application Ser. No. 07/842,453, filed Feb. 27, 1992, U.S. Pat. No. 5,208,950.

FIELD OF THE INVENTION

The present invention relates to locking devices for gripping and locking elastic cords against longitudinal movement, and in particular, for use in locking an elastic cord which is subjected to forces tending to stretch the same.

BACKGROUND OF THE INVENTION

The advent of light weight yet strong elastic cords has permitted the design of restraining nets that have a wide range of uses to restrain movement of articles. A recent example of the use of such elastic cords have been in automobiles in which a flexible net is positioned across a portion of the vehicle trunk with the end corners of the net formed in a loop which is, in turn, attached by a suitable fastening member to the automobile. The net generally lies flush with the adjacent portion of the automobile trunk wall and when in use the net is stretched and the articles to be stored are positioned between the net and the trunk wall. Under normal use the net is then subjected to forces which tend to stretch the elastic cord loops. In many net designs the loop is formed by taking a portion of a net cord, simply looping it and fastening the adjacent cord lengths that form the loop with a suitable mechanical fastener. Such arrangement is well-known and has been used in prior art designs, however, with the advent of stretchable plastic cords the prior art mechanical designs for securing the adjacent cord lengths together tend to slide along the length of the cords when the cords are stretched as the constant stretching and collapsing of the cord tends to loosen its mechanical connection.

The prior art devices of which Applicant is aware are disclosed in U.S. Pat. Nos. 4,156,574, 4,379,358 and 4,455,717. These patents disclose rope or cord clamping devices or locks which are formed of two releasably engageable members which are slidably interconnected to each other by inserting one member into one end of the other connecting member. Such sliding interconnection forces two segments of a rope or cord disposed in one of the connected members into a fixed engagement with the abutting surfaces of the two connector members. The rope or cord segments are typically disposed at an angle or in an arcuate path to resist slippage.

Another example of a prior art cord locking device is disclosed in U.S. Pat. No. 5,029,371. The locking device disclosed therein is used for elastic laces and is formed of two disc-shaped bodies each having two sets of pairs of aligned clamping teeth formed therein and facing each other. The two disc bodies when interconnected together cause the pair of teeth to be spaced apart to fixedly engage an elastic length extending therethrough.

Another locking device known to Applicant is disclosed in U.S. Pat. No. 4,999,887 and comprises a plastic base plate mountable on a support surface by means of an adhesive. The base plate includes a central, hollow cylindrical member and two shell-formed holding walls of generally arcuate form disposed on opposite sides of the central cylinder. Each of the shell-form holding parts is provided with a catch portion directed toward the central cylinder.

While the prior art, as known to Applicant, discloses the use of two-part connectors for securing a rope or cord in a fixed position wherein the connectors have mating parts which engage each other to trap the rope or cord therein, none teach or suggest the feature of the elastic cord lock of the present invention which will lockingly engage a stretchable elastic cord such as a bungee cord to prevent the same from any slippage when the cord lock is engaged.

SUMMARY OF THE INVENTION

The present invention comprises a mechanical cord lock forming a non-slipping loop in an elastic cord such as elastic bungee cord employed in a vehicle restraining net. The connector includes two releasably engageable parts one of which has concave sidewalls formed on opposite sides thereof and a central wall formed intermediate the concave sidewalls. The second part has spaced concave sidewalls each with a pair of depending legs formed on opposite end walls which when mated with the first connector part defines two tortuous paths through the connector parts which ensure that the elastic cord lengths that are placed therethrough in a stretched position remain in such position without slippage.

It is therefore the object of the present invention to provide a cord lock which is adapted to secure two portions of an elastic cord therein such that the cords portions remain in position without slippage during use.

Other objects, advantages and applications of the present invention will become apparent to those skilled in the art of cord locks when the accompanying description of one example of the preferred embodiment of the present invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

THE PREFERRED EMBODIMENT

Figure 1:
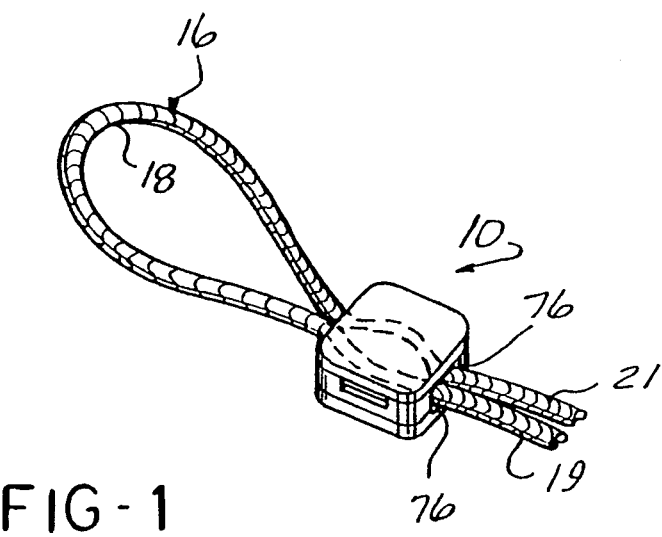
FIG. 1 is a perspective view of a cord lock engaging two lengths of an elastic cord to define a loop section adapted to be attached to a fastener so as to secure the cord and permit a restraining net (not shown) to be stretched without slippage between the cord lock and the cord.
Figure 2:
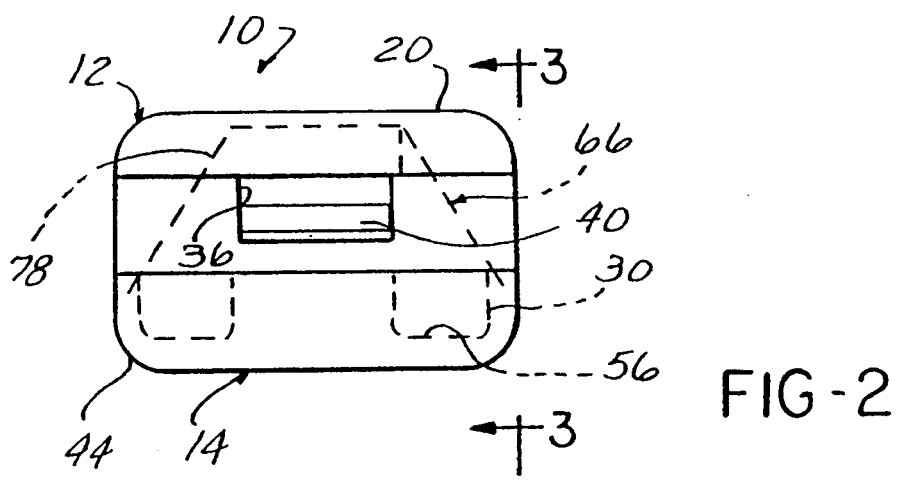
FIG. 2 is side elevational view of the cord lock illustrated in FIG. 1 with the cord removed.
Figure 3:
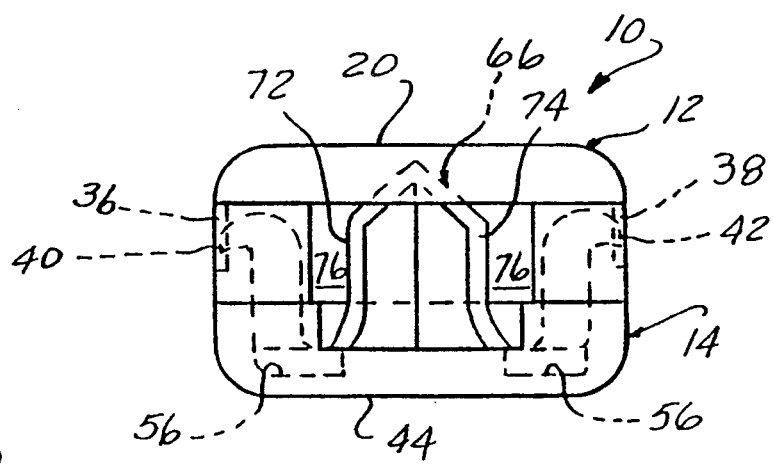
FIG. 3 is a side elevational view of the cord lock illustrated in FIG. 2 as seen from line 3—3 thereof.

Referring now to the drawings and, in particular, to FIG. 1 wherein there is illustrated an elastic cord lock 10 forming a non-slipping loop portion 18 in an elastic cord 16 such as an elastic bungee cord employed in a vehicle net of the type commonly used in automobile trunks. The elastic cord 16 is adapted to be secured at the loop portion 18 by means of a conventional fastener that is attached to the body portion of a automobile interior such as the interior wall of an automobile trunk.

Figure 4:
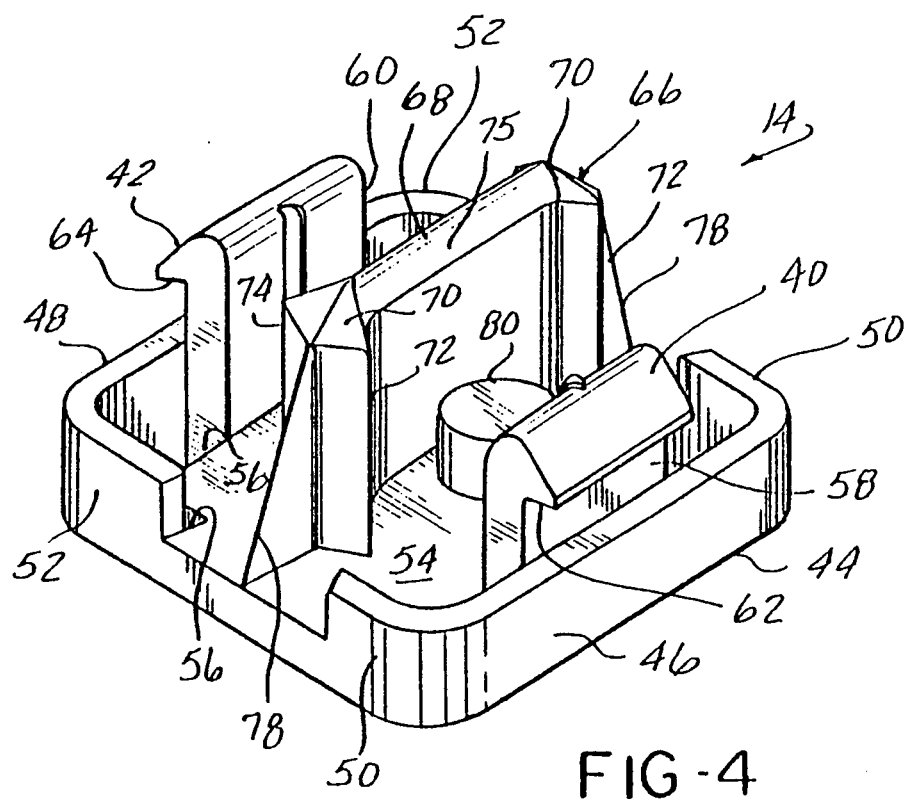
FIG. 4 is a perspective view of the male portion of the cord lock illustrated in FIGS. 1-3.

The elastic cord lock 10 comprises a female interlocking body 12 (FIG. 5) that is adapted to be lockingly engaged by a male body 14 (FIG. 4). The male body 14 and the female body 12 are adapted to engage each other in a snap-lock arrangement to secure the elastic or stretchable cord 16 to form the loop 18 having cord lengths 19 and 21 which pass through the cord lock 10 in a manner to be described hereinafter. The male body 14 and the female body 12 are so designed that if desired the bodies may be disengaged and separated to release the cord 16.

Figure 5:
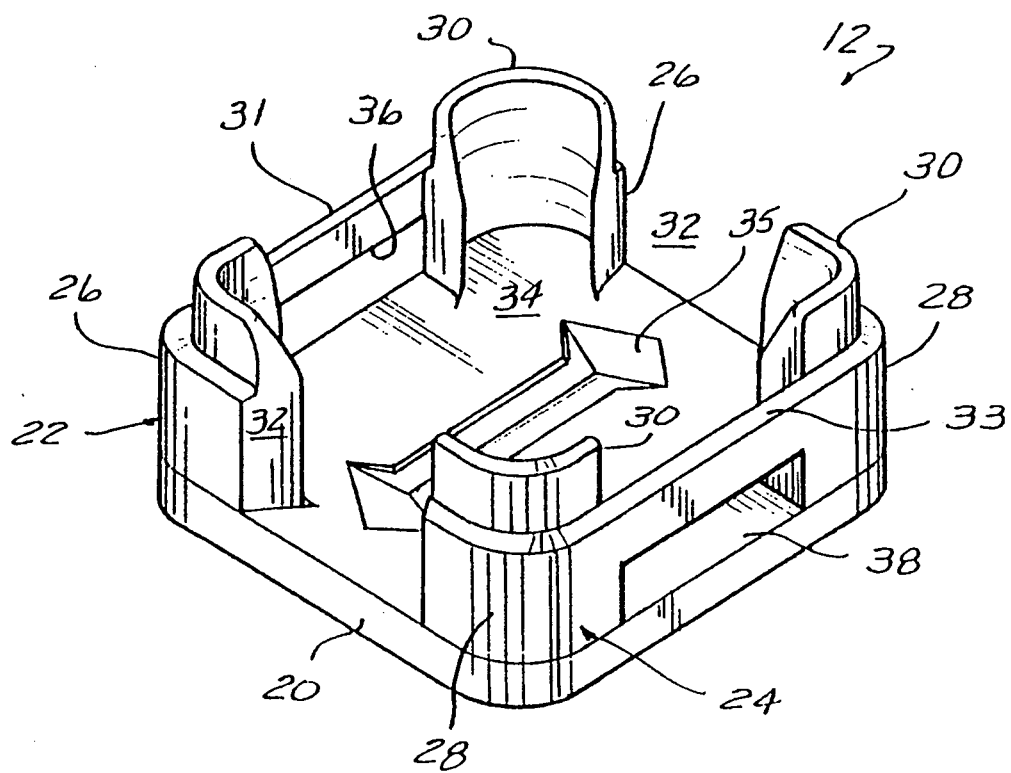
FIG. 5 is a perspective view of the female portion of the cord lock illustrated in FIGS. 1-3.

As can best be seen in FIG. 5 the female body 12 comprises a base 20 having upstanding opposed sidewalls 22 and 24 which respectively terminate in rounded end sections 26 and 28 which define a generally concave-shaped inner wall surface. The end sections 26 and 28 each have integrally aligned pins 30 projecting from the concave surface thereof. The top sections of the walls 22 and 24 respectively define support surfaces 31 and 33. The opposite end sections 26 and 28 are spaced apart at a predetermined distance to define aligned cord receiving openings 32 through which the cord lengths 19 and 21 pass through. The central interior surface 34 of the female body 12 has an I-shaped recess 35 formed therein, the purpose of which will be described hereinafter in greater detail. The upstanding concave sidewalls 22 and 24 each, respectively, have rectangularly-shaped openings 36 and 38 which function to snap-lockingly engage lateral projections 40 and 42 formed on the male body 14, which will likewise be described in greater detail hereinafter.

Referring now to FIG. 4, the male body 14 comprises a base 44 having upstanding opposing sidewalls 46 and 48 which, similarly to the female sidewalls 22 and 24, terminate in rounded end sections 50 and 52 and abut the support surfaces 31 and 33 of the female walls 22 and 24, respectively, when the bodies 12 and 14 are lockingly engaged as will be described hereinafter. The male sidewalls 46 and 48 define a generally concave-shaped surface complementary to the concave surface of the female body 12. The interior surface 54 of the male body 14 has curved recesses 56 formed adjacent to each of the end sections 50 and 52. The curved recesses are sized to matingly receive the alignment pins 30 formed on the female body walls 26 and 28 when the bodies 12 and 14 are connected.

The central portion of the male body walls 46 and 48 each have upstanding flexible or resilient projections 58 and 60 which terminate in the aforementioned laterally extending projections 40 and 42 to define angled shoulders 62 and 64. These shoulders will snap-lockingly engage the openings 36 and 38, respectively, formed in the female body sidewalls 22 and 24 when the female body 12 is connected to the male body 14.

The male body 14 further comprises an I-shaped projection 66 having a central web 68 that terminates in cross members 70 having outer ends 72 and 74 that are located at predetermined distances from rounded end sections 26 and 28 formed on the female body 12 which together define a cord locking opening 76. The upper surface 75 of the I-shaped projection 66 is tapered downwardly and matingly engages the recess 35 formed in the female body 12 when the female body 12 and the male body 14 are connected. The longitudinal ends of the I-shaped projection 66 have triangularly-shaped webs 78 which extend therefrom to the surface 54 of the male body base 44 and divide the opening 32 to guide the cord lengths 19 and 21 around the I-shaped projection 66 through the cord locking opening 76.

The male body base 44 includes a pair of cylindrically-shaped projections 80 (only one of which is illustrated) located centrally of the web 68 between the same and the snap-lock projections 58 and 60 to confine the cord lengths 19 and 21 when the female body 12 and male body 14 are connected. When the loop 18 is to be formed, the lengths 19 and 21 are first positioned through the male section such that the cord lengths 19 and 21 are positioned through the tortuous path defined by the opposing surfaces of the sidewalls and the web. The cord lengths 19 and 21 each have a diameter which when fully stretched will fit in the tortuous path between the concave sidewalls and the I-shaped projection 66. While the cord lengths 19 and 21 are in the stretched position, the female and male sections 12 and 14 are brought together until the projections 40 and 42 snap-lockingly engage the openings 36 and 38 while simultaneously the female body alignment pins 30 engage the male body recesses 56 so as to properly align the female body 12 with the male body 14 and lockingly securing the cord lengths 19 and 21 within the tortuous path defined by the I-shaped projection 66 and the opposing surfaces of the female body rounded end sections 26 and 28. The distance between the two bodies are such that when the cord length is in the stretched position an interference fit is created between the cord lengths 19 and 21 and the female and male bodies maintaining the cord lengths 19 and 21 in a stretch condition preventing any slippage between the same. When in use pressure is applied to the storage net so as to stretch the loop 18. The cord lengths 19 and 21 will not be loosened relative to the lock as these cord lengths are pre-stretched and slippage is virtually eliminated.

In the preferred embodiment the components are preferably made from a glass-filled nylon which is injection molded.

While the preferred embodiment utilizes the snap lock arrangement to join the components, other attachment means may be employed, such as an adhesive or ultrasonic welding.

Having just described the invention it should be noted that other forms of the invention may be had all coming within the spirit of the invention and scope of the appending claims.

I claim:

1. An elastic cord lock for securing two sections of cord and preventing slippage therebetween, the cord lock comprising:

two body portions each having sections which, joined together, define non-linear tortuous paths for each of the cord sections, the non-linear tortuous path being sized such that the cords must be stretched to be positioned within such tortuous paths;

an interior surface disposed on one of the body portion sections;

a cylindrically-shaped projection extending outwardly from the interior surface for confining the cord sections; and means for securing the body portions to each other to lock the cords in position.

2. The cord lock defined in claim 1, further comprising means for releasably securing the body portions to each other to releasably lock the cords in position.

3. An elastic cord lock for securing two sections of cord and preventing slippage therebetween, the cord lock comprising:

two body portions each having sections which, joined together, define non-linear tortuous paths for each of the cord sections, the non-linear tortuous paths being sized such that the cords must be stretched to be positioned within such tortuous paths;

an interior surface disposed on one of the body portion sections;

two projections extending outwardly from the interior surface for confining the cord sections; and means for securing the body portions to each other to lock the cords in position.

4. The cord lock defined in claim 3, further comprising means for releasably securing the body portions to each other to releasably lock the cords in position.

5. An elastic cord lock for securing two sections of cord and preventing slippage therebetween, the cord lock comprising:

two body portions each having sections which, joined together, define non-linear tortuous paths for each of the cord sections, the non-linear tortuous paths being sized such that the cords must be stretched to be positioned within such tortuous paths, one of the body portion sections having an interior surface;

means for releasably securing the body portions to each other to releasably lock the cords in position; and two cylindrically-shaped projections extending outwardly from the interior surface for confining the cord sections.

* * * * *